Figure 1:
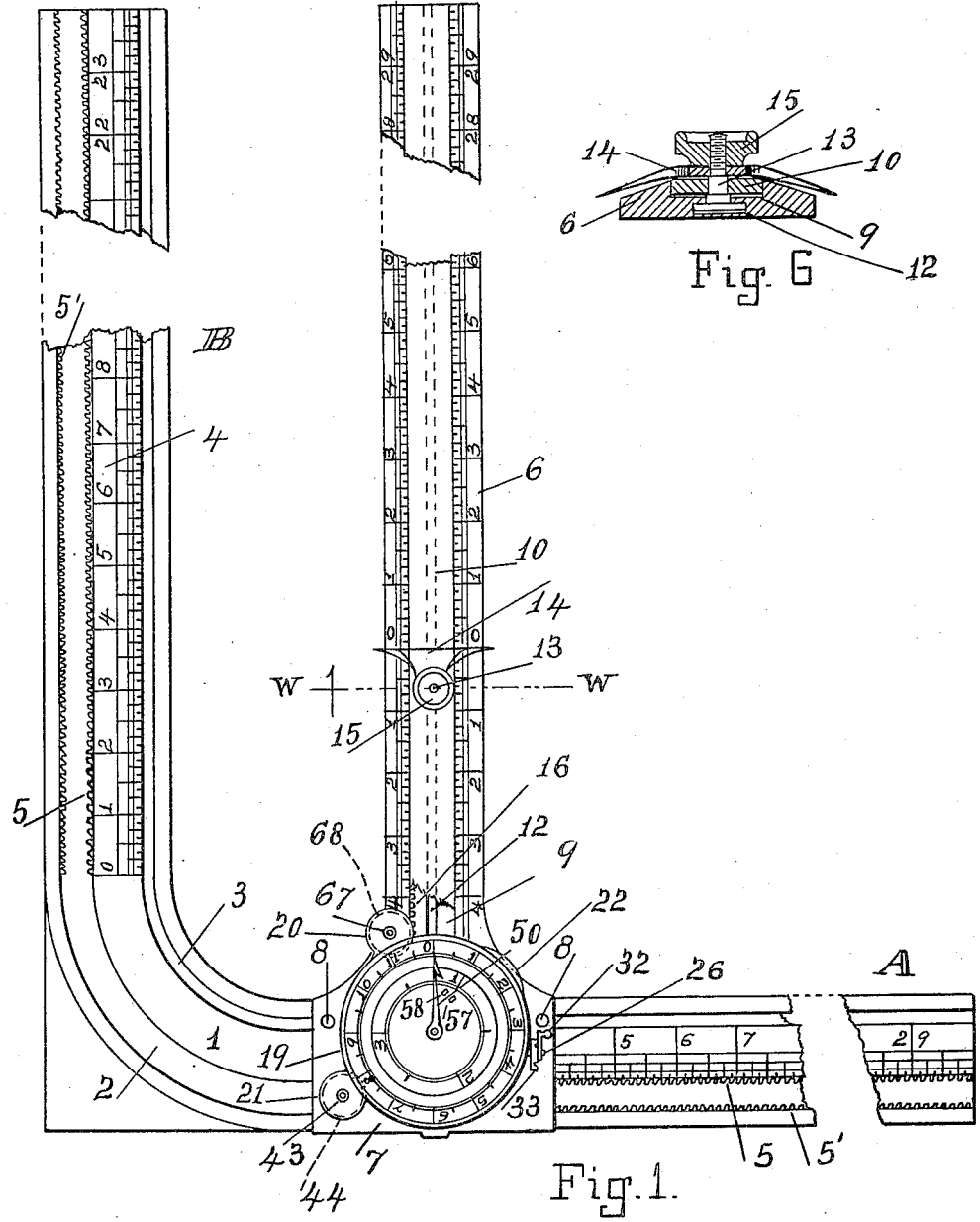

C. H. SCHENK.
DRAFTING AND SCALING INSTRUMENT.
APPLICATION FILED MAY 27, 1912.

1,057,583.

Patented Apr. 1, 1913.
4 SHEETS—SHEET 3.

Witnesses.

Inventor.
CLEVELAND H SCHENK.
by Att'y N. DuBois.

C. H. SCHENK.
DRAFTING AND SCALING INSTRUMENT.
APPLICATION FILED MAY 27, 1912.

1,057,583.

Patented Apr. 1, 1913.

4 SHEETS—SHEET 4.

Witnesses.
Pearl Shain.
Ray H. Fornell.

Inventor.
Cleveland H. Schenk.
by Atty N. DuBois.

UNITED STATES PATENT OFFICE.

CLEVELAND H. SCHENK, OF SPRINGFIELD, ILLINOIS.

DRAFTING AND SCALING INSTRUMENT.

1,057,583.   Specification of Letters Patent.   Patented Apr. 1, 1913.

Application filed May 27, 1912. Serial No. 700,021.

*To all whom it may concern:*

Be it known that I, CLEVELAND H. SCHENK, a citizen of the United States, residing at Springfield, in the county of Sangamon and State of Illinois, have invented a new and useful Drafting and Scaling Instrument, of which the following is a specification.

This invention relates to drafting and scaling instruments.

The general purpose of the invention is to provide an instrument adapted for use by draftsmen in making scale drawings and adapted for use by estimators in taking dimensions from scale drawings; the instrument being equipped with indicators adapted to indicate in feet, inches, and fractions of an inch the dimensions of the drawing according to the scale used in making the drawings.

More specific purposes of the invention are to provide a square graduated for inches and fractions of an inch, a blade adapted to slide on the square and graduated for inches and fractions of an inch, a slide adapted to slide on the blade and equipped with a pointer adapted to point to the graduations on the blade or to the points or lines of the drawing; to provide in connection with the square the blade and the slide, a train of gears and indicators actuated by said train of gears and adapted to indicate in feet and inches the scope of movement of the blade on the square according to the scale which is being used, or to indicate the scope of movement of the slide on the blade according to the scale which is being used; to provide spring-actuated means for returning the indicators to the normal or zero position immediately after the indicated dimension has been marked on the drawing or taken therefrom as the case may be; and to provide other novel features of construction hereinafter set forth.

The invention consists in the novel features of construction and combinations of parts shown in the annexed drawings to which reference is hereby made and hereinafter particularly described and finally recited in the appended claims.

Figure 2:
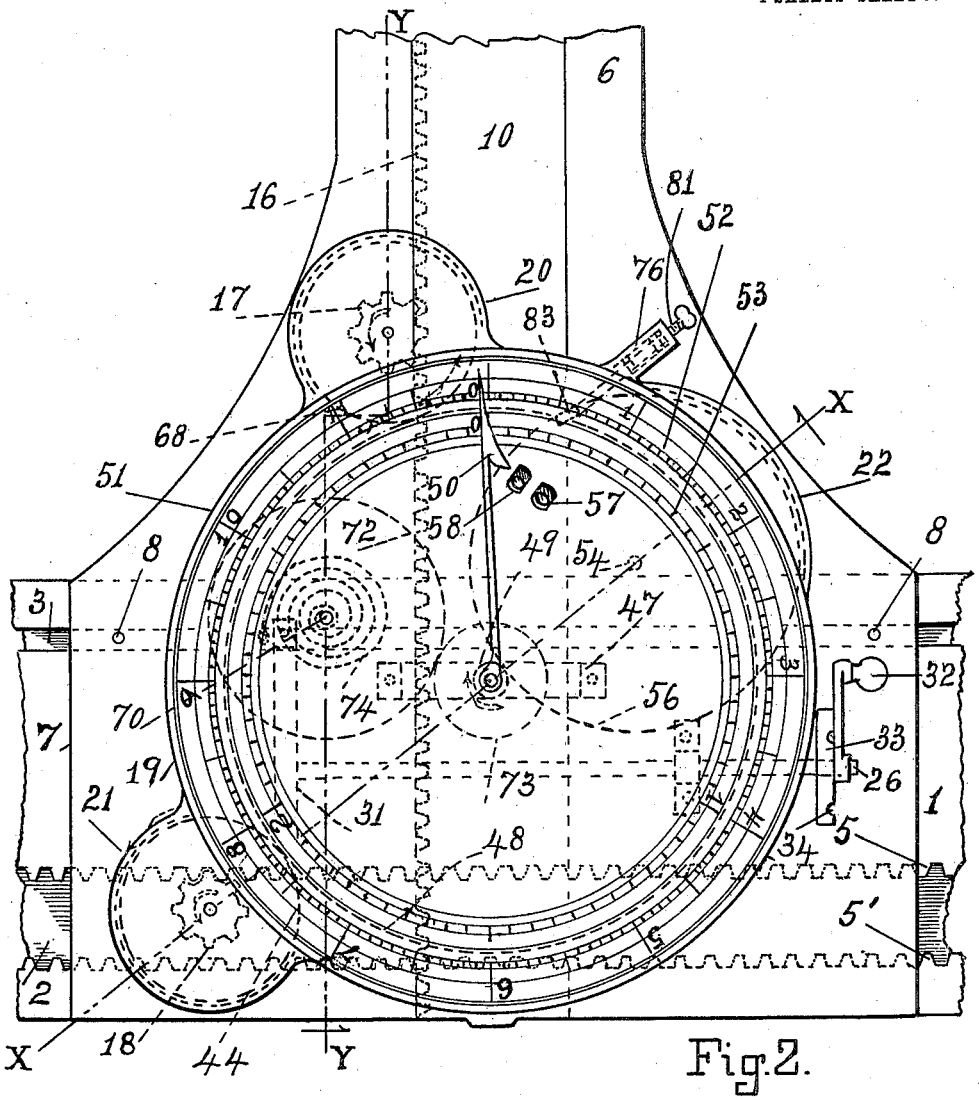
Figure 3:
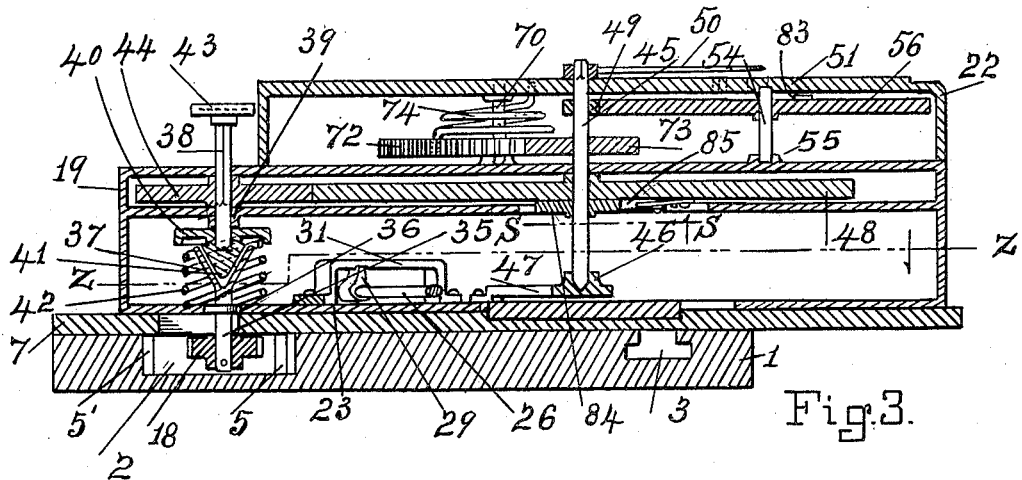
Figure 4:
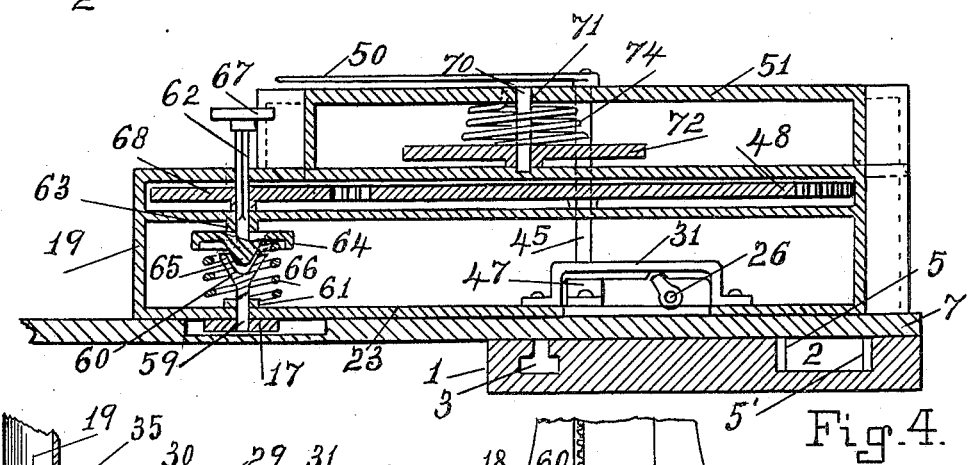
Figures 5, 7:
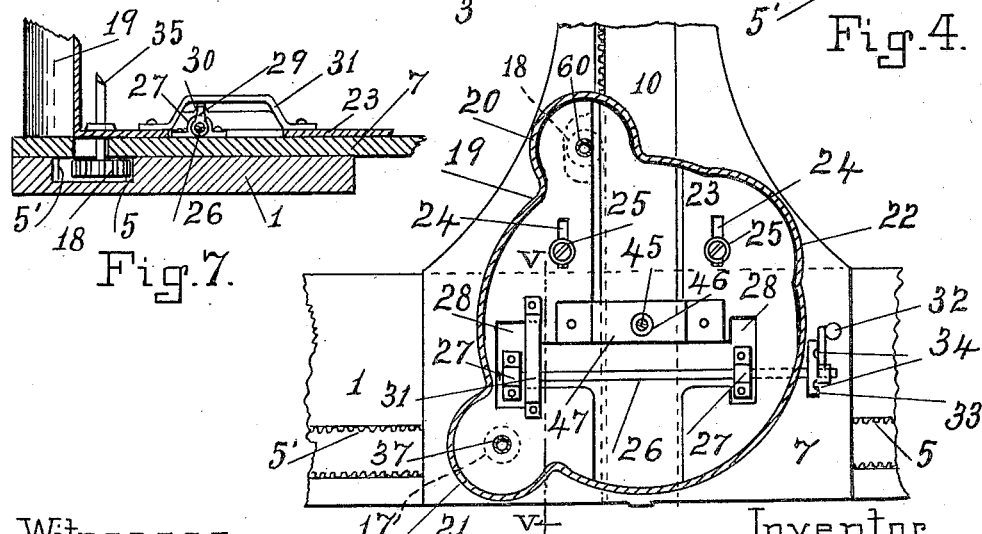
Figure 8:
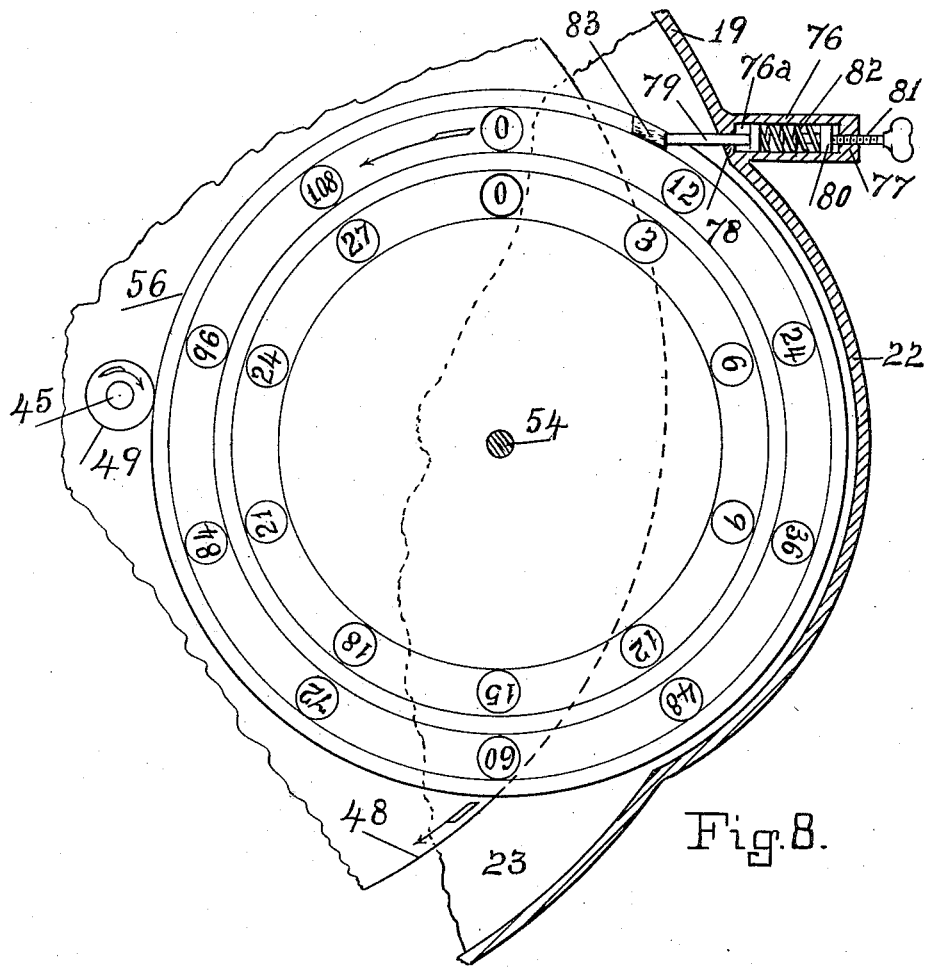
Figure 9:
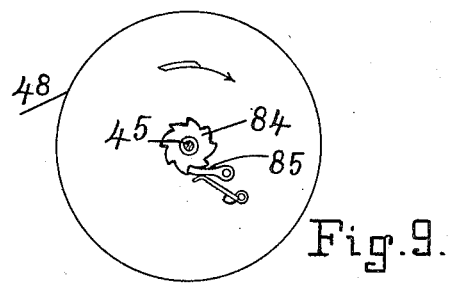

Figure 1 is a top plan of the instrument. Fig. 2 is an enlarged broken diagrammatic top plan showing the indicators and the train of gears actuating same. Fig. 3 is a vertical section on the oblique line X. X. of Fig. 2. Fig. 4 is a vertical section on the zig-zag line Y. Y. of Fig. 2. Fig. 5 is a reduced horizontal section on the line Z. Z. of Fig. 3. Fig. 6 is an enlarged transverse section on the line W. W. of Fig. 1. Fig. 7 is an enlarged vertical section on the line V. V. of Fig. 5. Fig. 8 is an enlarged detail of the means for limiting reverse rotation of the indicators; and Fig. 9 is a reduced horizontal section on the line S. S. of Fig. 3.

Similar reference characters designate like parts in the different views.

The square 1 is preferably of metal and has channels 2 and 3 occupying the entire length of the square. Its upper surface 4 between the channels 2 and 3 has graduations for inches and fractions of an inch. The side walls of the channel 2 have racks 5 and 5′, each rack having eight cogs for each inch of its length. The blade 6 has an integral head 7 mounted to slide on top of the square. Downwardly extending rigid pins 8 on the under side of the head 7 fit loosely in the channel 3 and guide the movement of the head on the square. The blade 6 also has an upper longitudinal channel 9 (Fig. 6) in which the slide 10 slides and a lower longitudinal channel 12 in which the head of the bolt 13 slides. A shouldered bolt 13 having its head in the channel 12 extends upward through the slide 10. A pointer 14 surrounds the bolt 13 above the slide 10 and the points of the pointer extend laterally beyond the edges of the blade. A nut 15 screwing onto the bolt 13 secures the pointer on the bolt so that the pointer will move freely above the blade 6. The upper surface of the blade 6 is graduated for inches and fractions of an inch.

If the instrument be used for drafting, the nut 15 will serve as a handle to move the slide outward according to the requirements of the work, and the pointer will point to the graduation on the blade corresponding to the outward movement of the slide.

If the instrument be used to take the dimensions from a drawing, the nut 15 will serve as a handle to move the slide inward or outward as may be desired, and the moving of the slide will cause the indicator to indicate the degree of movement of the slide as hereinafter described.

On one edge of the slide 10 is a rack 16 having eight cogs to the inch. A revoluble pinion 17 (Fig. 2) has in its circumference eight cogs which mesh in the rack 16, so that the pinion will make one revolution each time that the slide 10 moves one inch inward or outward. A similar revoluble pinion 18 has in its circumference eight cogs which mesh with the rack 5 or 5', as the case may be, so that the pinion will make one revolution each time that the head 7 slides one inch in either direction on the square 1. The pinions 17 and 18 drive the gears which actuate the indicators as hereinafter set forth. The gear box 19 of approximately circular form, is situated on top of the head 7 and is capable of limited horizontal movement on the head in a direction transverse to the head and parallel to the line of movement of the slide 10. The gear box 19 has extensions 20, 21, and 22 and a floor 23.

Screws 25 (Fig. 5) extend through slots 24 in the floor 23 and screw into the head 7 to connect the gear box with the head so that the sliding of the box on the head will be guided by the screws 25 in the slots 24. A shaft 26 is mounted to oscillate in stationary bearing blocks 27 on the upper surface of the head 7. Openings 28 in the floor accommodate the upwardly extending blocks 27 and the finger 29 so that when the box is slid on the head the floor will not strike the blocks or the finger. The upwardly extending finger 29 secured on the shaft 26 engages in a notch 30 in the underside of a fixed plate 31 on top of the floor 23.

In Fig. 7 the gear 18 is shown in mesh with the inner rack 5. If the shaft 26 be oscillated to cause the finger 29 to move toward the left the upper end of the finger engaging in the notch 30 will cause the box 19 to slide to the left and the sliding of the box to the left will cause the gear 18 to move to the left out of mesh with the inner rack 5 and into mesh with the outer rack 5'.

The purpose of shifting the gear 18 as described is that the gear may always rotate in the same direction when in mesh with either rack, that is to say; if the gear be in mesh with the inner rack 5 and the head 7 be slid to the right on the square 1 (Fig. 2) the gear will be caused to rotate counter-clockwise, and if the gear be then shifted out of mesh with the inner rack 5, and into mesh with the outer rack 5' and the head 7 be slid to the left on the square 1 the sliding of the head to the left will cause the gear 18 in mesh with the rack 5' to rotate counter-clockwise, the same as before. This construction admits of taking the readings of the square from left to right or from right to left according to the movement of the head on the square and in either case the indicators will rotate in the proper direction to correctly indicate the readings in accordance with the scale which is being used.

The handle 32 on the shaft 26 may be used to oscillate the shaft. A stationary plate 33 on the head 7 has notches 34 in which the handle 32 engages to keep the handle in the position in which it may be set and thereby prevent accidental sliding of the gear box.

The gear 18 is fixed on a short vertical shaft 35 (Fig. 3) which rotates in a suitable bearing 36 on the floor 23. At the upper end of the shaft 35 is a cup-shaped clutch-member 37. A second vertical shaft 38 in line with the shaft 35 has a cylindrical lower part and a polygonal upper part. The shaft 38 is mounted to rotate and slide in a suitable bearing 39 in the box 19. A disk 40 having a central conical protuberance 41 is rigidly connected with the shaft 38. The protuberance 41 is complemental to the cup 37 and together they form a friction clutch between the shaft 35 and the shaft 38. A spring 42 surrounds the cup 37, the lower end of the spring rests on the floor 23 and its upper end contacts with the underside of the disk 40 and the spring acts to support the disk to normally keep the clutch-member 41 disengaged from the clutch-member 37 and keep the shaft 38 normally at rest. A push button 43 at the upper end of the shaft 38 may be used to depress the shaft to cause engagement of the clutch-member 41 with the clutch-member 37.

The shaft 35 will be caused to rotate by the gear 18 engaging in the rack 5, or 5', as the case may be, when the head 7 is moved longitudinally on the square 1. The shaft 38 will normally be at rest and will rotate only when it is depressed and the clutch-member 41 is in engagement with the clutch-member 37 on the rotating shaft 35. A gear wheel 44 on the polygonal part of the shaft 38 rotates with the shaft, and the shaft slides in the hub of the wheel. A vertical shaft 45 central with respect to the dial plate is mounted to rotate in a bearing 46 on a bridge 47 centrally located on the floor 23 of the gear box 19. The bridge 47 supports the shaft 45 above the slide 10 so that the slide will move freely under the lower end of the shaft and so that the box 19 may slide on the head 7 without striking the slide. A gear wheel 48 loose on the shaft 45 meshes with and is driven by the wheel 44 on the shaft 38. A pinion 49 and a hand 50 are secured on the shaft 45. A dial plate 51 is stationary on top of the gear box 19. Two concentric circular scales 52 and 53 are inscribed on the face of the dial plate. The circumference of the outer circular scale 52 is divided into twelve equal parts each representing one foot, and each of said parts is subdivided into twelve equal parts each representing one inch on a scale of a quarter of an inch to the foot. The circumference of the inner circular scale 53 is divided into three equal parts each representing one foot on a scale of one inch to the foot, and each of said parts is subdivided into twenty-four equal parts each representing a half inch on the same scale.

The pinion 18 makes one complete revolution for each inch that the head slides on the square. The gear 44 on the shaft 38 rotates in unison with the gear 18.

The diameter of the driven gear 48 is three times the diameter of the driving gear 44, hence one revolution of the gear 44 will cause the gear 48 and the shaft 45 with which it is connected by the ratchet wheel 84, to make one-third of a revolution. If the work to be executed or measured is on the scale of one inch to the foot the reading will be on the inner circular scale 53, and each time that the head 7 slides one inch on the square 1 the gear 48 will cause the hand 50 to make one-third of a revolution; and three revolutions of the gear 18 will cause one complete revolution of the hand above the dial.

Means to prevent the hand above the dial plate from rotating in the wrong direction in case the head or the slide is moved in the wrong direction will now be described. A ratchet wheel 84 (Fig. 9) is secured on the shaft 45. A spring-pressed pawl 85 pivotally connected with the wheel 48 is adapted to engage the teeth of the ratchet wheel 84 to cause the shaft 45 and the hand 50 connected with the shaft to rotate in unison with the wheel 48, in the proper direction for indicating the readings on the circular scales of the dial plate. If the head or the slide be moved in the wrong direction thereby causing reverse rotation of the wheel 48, the pawl 85 carried by the reversely rotating wheel 48 will run around on the circumference of the ratchet wheel 84 and the shaft 45 and the hand 50 connected with the shaft will remain at rest. A vertical second shaft 54 is mounted to rotate in bearings 55 on the gear box 19 and the dial plate 51. A cog wheel 56 fixed on the shaft 54 meshes with and is driven by the pinion 49.

The diameter of the wheel 56 is ten times the diameter of the pinion 49, hence one revolution of the pinion will cause the wheel to make one-tenth of a revolution. On the upper surface of the wheel 56 (Fig. 8), called the counter wheel are inscribed two series of numbers arranged in two concentric circles each series comprising ten numbers. In the inner circle are inscribed the numbers 0, 3, 6, 9, 12, 15, 18, 21, 24, and 27 each number after "3" being a multiple of three. The numbers are separated from each other by equal spaces and are in such a position on the wheel that if the wheel be rotated the numbers will come in succession under the opening 57 of the dial plate 51 and may be read through the opening. In the outer circle are inscribed the numbers 0, 12, 24, 36, 48, 60, 72, 84, 96, and 108, each number after "12" being a multiple of twelve. The numbers are separated from each other by equal spaces and are in such a position on the wheel that if the wheel be rotated the numbers will come in succession under the opening 58 of the dial plate and may be read through the opening. If the work is on the scale of one inch to the foot the numbers of the inner circle appearing through the opening 57 will be read and if the work is on the scale of a quarter of an inch to the foot the numbers in the outer circle appearing through the opening 58 will be read, as hereinafter described. The means for rotating the hand 50 above the dial plate 51 while the head 7 is being slid lengthwise on the square 1 and the means for rotating the counter wheel 56 to bring to view the successive numbers of the two series of numbers on said wheel while the head 7 is being slid lengthwise on the square 1 having been described.

I will now describe the means connecting the hand 50 and the counter wheel 56 with the slide 10 so that the hand and the wheel will correctly indicate the movements of the slide 10. The slide 10 has on one edge a rack 16 having eight cogs to the inch. The gear 17 having eight cogs in its circumference meshes with the rack 16 and the sliding of the slide 10 on the blade 6 causes the gear to rotate. The gear 17 (Fig. 4) is fixed on a short vertical shaft 59. The shaft 59 has at its upper end a cup-shaped clutch-member 60 and rotates in a bearing 61 on the floor 23. A shaft 62 having a cylindrical lower part and a polygonal upper part rotates and slides in a bearing 63 in the box 19 in line with the shaft 59. A disk 64 is secured on the shaft 62 and has a central protuberance 65 forming a clutch-member complemental to the clutch-member 60. A spring 66 surrounds the clutch-member 60 and supports the disk 64 to normally keep the clutch-member 65 out of engagement with the clutch-member 60. A push button 67 at the upper end of the shaft 62 serves to depress the shaft and compress the spring to cause engagement of the clutch-members 60 and 65. A cog gear 68 on the shaft 62 meshes with and drives the gear 48 on the shaft 45. The shaft 62 slides in the hub of the gear 68. The diameter of the driven gear 48 is three times the diameter of the driving gear 68 hence one revolution of the gear 68 will cause the gear 48 and the shaft 45 with which it is connected to make one-third of a revolution.

The revolution of the gear 48 will cause the hand 50 to rotate above the dial plate 51. If the work is on the scale of one inch to the foot the reading will be on the inner circular scale 53 and each time that the slide 10 slides one inch on the blade 6 the gear 48 will cause the hand 50 to make one-third of a revolution and three revolutions of the gear 44 will cause one complete revolution of the hand above the dial. If the work is on the scale of one-quarter of an inch to the foot the reading will be on the outer circular scale 52 exactly the same as already described, with respect to the sliding of the head on the square. After the head has been slid on the square, or the slide has been slid on the blade and the reading has been taken as described it is necessary to restore the moving parts to their initial positions in readiness for the next operation. This is effected by means which will now be described. A vertical winder shaft 70 is mounted to rotate in bearings 71 in the box 19. A cog gear 72 is secured on the winder shaft 70. The gear 72 meshes with the gear 73 which is fixed on the shaft 45. A helical spring 74 surrounds the shaft 70 and has one end connected with the gear 72 and the other end connected with the dial plate 51. Rotation of the shaft 45 caused by the sliding of the head 7 on the square 1 or by the sliding of the slide 10 on the blade 6, as has been already described, will cause winding of the spring 74 and when the sliding pressure on the head or the slide, as the case may be, is discontinued the spring 74 will act to cause reverse rotation of the gears 72, 73, 48, 49, and 56 to restore the parts to their original position in readiness for the next operation. After the spring 74 has been wound as described by the sliding of the head or the slide, as the case may be, and the sliding pressure on the head or the slide has been discontinued the spring will act quickly to cause reverse rotation of the gears. On account of this sudden action of the spring it is necessary to provide means which will now be described, to absorb the shock caused by concussion of the parts and to prevent excessive reverse rotation of the gears.

On the upper surface of the counter wheel 56 is an upwardly extending lug 83. A housing 76 (Fig. 8) stationary on the box 19 has a circular bore 76ª, a central hold 78 extending through one end of the housing and a central screw-threaded hole 77 extending through the other end of the housing. A pin 79 has a circular head fitting loosely in the bore 76ª and a stem sliding freely in the hole 78. A follower 80 fits loosely in the bore 76ª. A screw 81 fits in the screw-threaded hole 77 and the end of the screw acts on the end of the follower 80. A coiled spring 82 is situated in the bore 76ª between the head of the pin 79 and the follower 80. In practice the stop 83 on the counter wheel 56 will strike against the end of the pin 79 when the counter wheel completes its reverse rotation as already described. When the parts are properly adjusted they will be in such relation to each other that the hand 50 above the dial will point to the zero marks on the circular scales 52 and 53, the numeral 0 of the inner circle of the counter wheel will be immediately under the opening 57, the numeral 0 of the outer circle of the counter wheel will be under the opening 58 and the stop 83 will be in contact with the end of the pin 79, as shown in Fig. 2. If reverse rotation of the gears causes the stop 83 to move too far and thereby throw the mechanism out of adjustment the screw 81 may be screwed inward to cause the follower 80 to compress the spring 82 and increase the tension thereof to the extent necessary for proper adjustment of the end of the pin 79 relative to the stop 83.

When the instrument is used in the ordinary way merely as a drafting instrument the left-hand edge of the head 7 will preferably be used as the reading edge when the head is sliding on the member A of the square and the right-hand edge of the head will be used as the reading edge when the head is sliding on the member B of the square. To take dimensions from the scale on the square without using the indicator, the head will be slid on the square to cause the reading edge to register with the required graduation on the square. In laying out an elevation the horizontal dimensions will preferably be taken from the member A of the square and the vertical dimensions will be taken from the blade 6 in the usual manner. If the desired vertical dimension is beyond the scope of the blade 6 the slide 10 may be slid outward on the blade and the extent of the movement of the slide will be indicated by the pointer 14 and may be added to the indicated length of the slide. Vertical dimensions may be taken by sliding the head 7 on the member B of the square and in that case horizontal dimensions will be taken from the blade 6. If the dimensions are to be taken from the member A or the member B of the square and the indicators are to be used, the operator will press downward on the button 43 to cause engagement of the clutch-members 41 and 37 to actuate the gears and cause the hand and the counter-wheel to rotate to register the measurements as already described.

If the readings are to be taken on the blade 6, the button 67 will be pressed downward to cause engagement of the clutch-members 65 and 60 to cause the hand and the counter-wheel to rotate to register the measurements as already described.

If the instrument be used to measure and indicate at one operation the entire length of a wall shown in the floor plan of a building, the top of the plan being north, the push button 43 will be depressed and the head will be slid on the square to measure the length of the east and west lines and indicate same on the dial and the push button 67 will be depressed and the slide 10 will be slid on the blade 6 to measure the length of the north and south lines and indicate same on the dial; and at the end of the operation the reading of the dial will be the sum of the lengths of the east and west and north and south lines and therefore the entire length of the wall. Other modes of use will be obvious to those skilled in the art.

Having fully described my invention what I claim as new and desire to secure by Letters Patent is:

1. In an instrument of the class described, the combination of a square; a blade movable relative to the square; a slide movable relative to the blade; and means for registering the cumulative movements of the blade relative to the square and the slide relative to the blade.

2. In an instrument of the class described, the combination of a square; a blade movable relative to the square; a slide movable relative to the blade; a dial plate having a circular scale with a zero or starting point; a rotative pointer initially pointing to zero on the circular scale of the dial plate and adapted to rotate to indicate on the circular scale of the dial plate successive movements of the blade and the slide; and means adapted to return the pointer to its initial position.

3. In an instrument of the class described, the combination of a square graduated for inches and fractions of an inch; a blade adapted to move relative to the square; a dial plate in fixed relation to the blade and having a circular scale comprising a zero or starting point and divisions and subdivisions for feet, inches and fractions of an inch, on a scale in harmony with the graduations of the square; a pointer normally resting at zero on the circular scale of the dial plate; and means for rotating the pointer to indicate on the circular scale of the dial plate readings in harmony with the movements of the blade relative to the square.

4. In an instrument of the class described, the combination of a square; a blade adapted to move relative to the square; a slide adapted to move relative to the blade; a dial plate having a plurality of dials with a zero designation and divisions and subdivisions numbered in accordance with different scales, for feet, inches, and fractions of an inch; a hand rotating adjacent to said dial plate to indicate the sum of the movements of the blade and the slide; and spring-actuated means adapted to return the hand to the zero position of the dials upon the completion of each operation.

5. In an instrument of the class described, the combination of a square; a head movable on the square; a slide movable on the head; a dial plate in fixed relation to the head and having graduations; a pointer adapted to rotate adjacent to the dial plate and point to graduations thereon; gears effective to rotate the pointer during the sliding of the head on the square; and gears effective to rotate the pointer during the sliding of the slide on the head.

6. In an instrument of the class described, the combination of a square; a head movable relative to the square; a slide movable relative to the head; a dial plate in fixed relation to the head and having a zero point and graduations; a pointer normally pointing to the zero point of the dial and adapted to rotate to point to graduations on the dial; gears effective to rotate the pointer during the movement of the head on the square and likewise effective to rotate the pointer during the movement of the slide on the head; and means for returning the pointer to the zero point on the dial after the movements on the head or the slide, as the case may be.

7. In an instrument of the class described, the combination of a square; a head adapted to move relative to the square; a slide adapted to move relative to the head; a dial plate having a zero point and graduations; a pointer normally pointing to zero on the dial plate and adapted to rotate to point to graduations on the dial plate; gears effective to rotate the pointer during the movement of the head on the square and likewise effective to rotate the pointer during the movement of the slide on the head; and means effective to return the pointer to zero point on the dial after the completion of the movement of the head on the square and the completion of the movement of the slide on the head.

8. In an instrument of the class described, the combination of a square; a head adapted to move relative to the square; a slide adapted to move relative to the head; a dial plate having a zero point and graduations; a pointer normally pointing to zero on the dial plate and adapted to rotate to point to graduations on the dial plate; gears effective to rotate the pointer during the movement of the head on the square; gears effective to rotate the pointer during the movement of the slide on the head; and spring-actuated means effective for reverse rotation of the pointer to zero on the dial, after the completion of the movement of the head on the square and the completion of the movement of the slide on the head.

9. In an instrument of the class described, the combination of a square having a longitudinal channel with racks on the side walls of the channel; a gear adapted to mesh with the rack on either side of the channel; a dial plate; a hand adapted to rotate adjacent to the dial plate; means operated by said gear to rotate the hand in a given direction when the gear is traveling in the rack on one side of the channel; and means for shifting the gear to cause it to travel in the rack on the other side of the channel, to rotate the hand in the same direction as before, when the gear is caused to travel in a reverse direction in the channel.

10. In an instrument of the class described, the combination of a square having a channel with a rack on each side of the channel; a revoluble first shaft adjacent to the channel in the square and having a clutch-member; a gear fixed on said first shaft and adapted to mesh with either rack in the channel of the square; a second shaft adapted to rotate and slide in line with said first shaft; a clutch-member on said second shaft adapted to engage the clutch-member on said first shaft; and a spring normally keeping said clutch-members apart.

11. In an instrument of the class described, the combination of a square having a rack; a first shaft equipped with a first gear meshing with the rack in the square; a second shaft normally at rest in line with the first shaft; a second gear on said second shaft; manually controlled means for connecting said second shaft with said first shaft to cause the shafts to rotate in unison; a third gear actuated by said second gear; a graduated dial plate adjacent to said third gear and a hand actuated by and rotating in unison with said third gear, to point to graduations on the dial plate corresponding to the degree of rotation of said third gear.

12. In an instrument of the class described, the combination of a square having a longitudinal channel and racks on the walls of the channel; a head mounted to slide on the square; a gear box having a floor and adapted to slide on the head; a gear mounted on the floor of the gear box and adapted to mesh in the racks of the square; an oscillative shaft mounted on the head; a notched plate stationary on the floor of the gear box; and a finger on said shaft engaging said notched plate to slide the gear box on the head to move said gear out of engagement with one rack and into engagement with the other rack.

13. In an instrument of the class described, the combination of a square; a head movable longitudinally on the square; a slide mounted to slide on the head in a direction transverse to the square; a gear box adapted to slide on the head in a direction transverse to the square; a bridge in the gear box above said slide; a bearing on said bridge adapted to support a shaft; a shaft rotative in said bearing above said slide; and a train of gears in said box, actuated by said shaft.

14. In an instrument of the class described, the combination of a head; a gear box adapted to slide on the head; an oscillative shaft on the head; connecting devices connecting the shaft with the gear box to slide the box upon partial rotation of the shaft; a handle adapted to oscillate said shaft; and means for holding said handle at the limit of its oscillation in either direction.

15. In an instrument of the class described, the combination of a square graduated for inches and fractions of an inch; a blade adapted to move relative to the square; a dial plate in fixed relation to the blade and having a circular scale with a zero or starting point and divisions and subdivisions for feet, inches, and fractions of an inch, on a scale in harmony with the graduations of the square; a pointer normally resting at zero on the circular scale of the dial plate; means for rotating the pointer to indicate on the circular scale of the dial plate readings in harmony with the movements of the blade on the square; and means for returning the pointer to zero position.

16. In an instrument of the class described, the combination of a square graduated for inches, and fractions of an inch; a blade adapted to move relative to the square; a dial plate in fixed relation to the blade and having a circular scale with a zero or starting point and divisions and subdivisions for feet, inches, and fractions of an inch, on a scale in harmony with the graduations of the square; a pointer normally resting at zero on the circular scale of the dial plate; means for effecting successive partial rotations of the pointer to indicate on the circular scale of the dial plate a reading in harmony with the sum of a plurality of successive movements of the blade on the square.

17. In an instrument of the class described, the combination of a square graduated for inches and fractions of an inch; a blade adapted to move relative to the square; a dial plate in fixed relation to the blade and having a circular scale with a zero or starting point and divisions and subdivisions for feet, inches, and fractions of an inch, on a scale in harmony with the graduations of the square; a pointer normally resting at zero on the circular scale of the dial plate; means for effecting successive partial rotations of the pointer to indicate on the circular scale of the dial plate a reading in harmony with the sum of a plurality of successive movements of the blade on the square; and means for returning the pointer to zero position at the completion of the operation.

18. In an instrument of the class described, the combination of a square graduated for inches, and fractions of an inch; a blade adapted to move relative to the square; a dial plate in fixed relation to the blade and provided with a plurality of circular series of graduations in harmony with the graduations of the square each series having a zero or starting point and divisions and subdivisions for feet, inches and fractions of an inch; a pointer normally resting at zero with respect to the circular series of graduations of the dial plate; and means for rotating the pointer to indicate on one circular series of graduations of the dial plate readings on one scale in harmony with the movements of the slide relative to the square and to indicate on another circular series of graduations of the dial plate on a different scale readings in harmony with the movements of the blade relative to the square.

19. In an instrument of the class described, the combination of a square graduated for inches, and fractions of an inch; a blade graduated for inches, and fractions of an inch and adapted to move relative to the square; a slide adapted to move relative to the blade; a dial plate in fixed relation to the blade and having a circular scale with a zero or starting point and divisions and subdivisions for feet, inches and fractions of an inch, on a scale in harmony with the graduations of the square and the graduations of the blade; a pointer normally resting at zero on the circular scale of the dial plate; manually controlled means for rotating the pointer in harmony with the movements of the blade relative to the square; manually controlled means for rotating the pointer in harmony with the movements of the slide relative to the blade; and means for returning the pointer to zero on the circular scale of the dial plate upon the completion of the operation.

20. In an instrument of the class described, the combination of a square graduated for inches, and fractions of an inch; a blade graduated for inches and fractions of an inch and movable relative to the square; a slide movable relative to the blade; a dial plate in fixed relation to the blade and provided with a plurality of concentric circular series of graduations each series having a zero or starting point and divisions and subdivisions for feet, inches, and fractions of an inch, on a scale in harmony with the graduations of the square and the graduations of the blade; a pointer normally resting at zero with respect to the circular series of graduations of the dial plate; manually controlled means for rotating the pointer to indicate on the graduations of the dial plate readings in harmony with the movements of the blade relative to the square and to indicate on the graduations of the dial plate readings in harmony with the movements of the slide relative to the blade; and means for returning the pointer to zero on the graduated scales of the dial plate upon the completion of the operation.

21. In an instrument of the class described, the combination of a square having a longitudinal channel with racks on the side walls of the channel; a head adapted to slide on said square; a first gear supported on the head and adapted to mesh with either rack in the channel of the square; a second gear co-axial with and rotating in unison with said first gear; a third gear actuated by said second gear; a fourth gear co-axial with and rotating in unison with said third gear; a dial plate concentric with said fourth gear and having openings; a pointer rotating in unison with said fourth gear and adapted to point to the designations on said dial plate; a fifth gear actuated by said fourth gear and having designations adapted to register with the openings in said dial plate, also having a lug; a shock absorber adjacent to said fifth gear and adapted to be engaged by said lug to limit reverse rotation of said fifth gear; a sixth gear co-axial with and rotating in unison with said third and fourth gears; a seventh gear actuated by said sixth gear; and a spring adapted to be wound during the rotation of said seventh gear in one direction and acting to cause reverse rotation of the entire train to an extent limited by the lug on said fifth gear striking against the shock absorber.

22. In an instrument of the class described, the combination of a square; a blade adapted to slide relative to the square; a slide adapted to slide on the blade and provided with a rack; a first gear meshing with the rack on the slide and rotative by the sliding of the lside; a second gear co-axial with and rotating with said first gear; a third gear actuated by said second gear; a dial plate concentric with said third gear and having a zero point, graduations and openings; a pointer adjacent to the dial plate and normally pointing to zero on the dial plate and adapted to rotate to point to graduations on the dial plate; a fourth gear co-axial with and rotating in unison with the third gear; a fifth gear actuated by said fourth gear and having designations positioned to register with the openings in said dial plate; means for limiting reverse rotation of said fifth gear; a sixth gear co-axial with and rotating with said fourth gear; a seventh gear actuated by said fourth gear; a spring adapted to be wound by the rotation of said seventh gear in one direction and acting to cause reverse rotation of all the gears to an extent limited by the means for stopping the reverse rotation of the fifth gear.

23. In an instrument of the class described, a square having a longitudinal channel and racks on the side walls of the channel; a head adapted to slide on the channel; a driver gear mounted on the head and meshing with a rack in the channel of the square and rotative by the sliding of the head on the square; a central main shaft mounted to rotate on the head; and a train of gears actuated by said driver gear and coöperating to rotate said central shaft in a predetermined direction; in combination with a gear loose on said central shaft and having a pawl and ratchet connection therewith and adapted to coöperate with other gears of the train to rotate the train when the driver gear travels in one direction in the channel in the head and effective to prevent reverse rotation of the shaft when the driver gear travels in the reverse direction in the channel of the square.

24. In an instrument of the class described, the combination of a square having a longitudinal rack; a blade adapted to slide on the square; a graduated dial plate mounted on the blade; a hand adapted to rotate to indicate graduations on the dial plate; a train of gears adapted to rotate said hand; a first driver gear adapted to engage in the rack of the blade and also adapted to rotate independently of said train of gears; and means effective to cause said driver gear to actuate said train of gears at the option of the user.

25. The combination of a square equipped with racks opposite to each other; a gear capable of movement lengthwise of the square and adaptable to mesh with either rack; a dial plate; a hand adapted to rotate adjacent to the dial plate; means operated by said gear to rotate the hand in a given direction when the gear is traveling in one direction in engagement with one rack; and means for shifting the gear to cause it to engage the other rack to rotate the hand in the same direction as before when the gear is caused to travel in a direction reverse of the direction of said first-named travel.

In witness whereof, I have hereunto signed my name at Springfield, Illinois, this 13th day of May, 1912.

CLEVELAND H. SCHENK.

Witnesses:
JOSEPH S. THOMPSON,
PEARL THAIN.

Copies of this patent may be obtained for five cents each, by addressing the "Commissioner of Patents. Washington, D. C."